United States Patent
Faver

(10) Patent No.: US 6,502,190 B1
(45) Date of Patent: *Dec. 31, 2002

(54) SYSTEM AND METHOD FOR COMPUTER SYSTEM INITIALIZATION TO MAXIMIZE FAULT ISOLATION USING JTAG

(75) Inventor: David Lloyd Faver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,798

(22) Filed: Nov. 2, 1999

(51) Int. Cl.[7] .............................................. G06F 15/177
(52) U.S. Cl. .................................. 713/2; 713/1; 714/25
(58) Field of Search ............................ 713/1, 2; 714/25

(56) References Cited

U.S. PATENT DOCUMENTS

| | | | | |
|---|---|---|---|---|
| 3,916,383 A | * | 10/1975 | Malcolm .................... | 709/103 |
| 5,574,730 A | * | 11/1996 | End et al. ................... | 714/724 |
| 5,781,546 A | * | 7/1998 | Sethu ......................... | 709/243 |
| 6,065,135 A | * | 5/2000 | Marshall et al. .............. | 714/11 |
| 6,119,246 A | * | 9/2000 | McLaughlin e al. .......... | 714/15 |

OTHER PUBLICATIONS

IBM Technical Disclosure Bulletin, Dec. 1993, US, Method for Execution Unit Level Fault Tolerance in Superscalar RISC Processors, Dec. 1, 1993, vol. Num: 36 Issue. Num.: 12, pp. 679–680.*

* cited by examiner

Primary Examiner—Thomas Lee
Assistant Examiner—James K. Trujillo
(74) Attorney, Agent, or Firm—Mark E. McBurney; Bracewell & Patterson, L.L.P.

(57) ABSTRACT

A sequenced initialization used for maximizing detection of errors and failures and triggering of respective attention signals. A number of computer devices each having a JTAG interface, an attention distribution sub-system, and a service processor are provided. Each computer device is inaccessible during a built in self test (BIST) and is coupled to an error register bit. Fences for computer devices are put up so that the inputs are in a known state and computer devices driving the inputs have no effect. BISTs for computer devices are performed as they are released from reset. Determination of when BISTs are complete and if each BIST has passed is performed.

24 Claims, 2 Drawing Sheets

SYSTEM AND METHOD FOR COMPUTER SYSTEM INITIALIZATION TO MAXIMIZE FAULT ISOLATION USING JTAG

BACKGROUND OF THE INVENTION

1. Technical Field

The present invention relates in general to maximizing fault isolation during computer system initialization and in particular to a system and method for system initialization to maximize fault isolation using JTAG.

2. Description of the Related Art

Analyzing and debugging errors and failures are often difficult to accomplish in large, complex computer systems such as in International Business Machine's (IBM's) RS6000 workstation. Such complex systems are so widely distributed with numerous key chips, components, and sub-systems that a failure or error that has occurred in one chip, component, or sub-system of the computer system is not realized or recognized by other chips, components, or sub-systems in the computer system. Debugging becomes particularly difficult in these complex computers when the error or failure occurs during the power up or initialization phase of the computer system as not all isolation mechanisms are enabled yet.

The entire computer system is not promptly or immediately stopped or halted when such failure(s) or error(s) has occurred during the system initialization. Thus, the computer system may continue to initialize, set up, operate, and execute even though an error or failure has occurred in at least one of the chips, components, or sub-systems of the computer system. Also, such present computer systems do not provide an easy way for identifying, locating, and debugging the error(s) or failure(s) that has or have occurred during the system initialization and the source of the error(s) or failure(s) at the time of system initialization.

Additionally, Joint Test Action Group (JTAG) architectures and features on chips are well known in the art. JTAG architectures and features provide a secondary or ancillary backdoor into the chips. Through JTAG architecture, access is provided to registers on the chip. These registers are used to stop clocks, enable and disable output drivers, and raise and lower fencing logic. In addition, JTAG is used to read error registers in the event of an error.

All key chips in such complex computer systems (i.e. RS6000 workstation) include bi-directional checkstop and attention logic, which are well known in the art. A checkstop is a fatal error that must be handled as quickly as possible. An example of such a fatal error is a parity error that triggers a checkstop to immediately handle the error. Other IBM systems have used checkstop to freeze all processor states in multiprocessor systems for each of the processors in the overall computer system. An attention may be a secondary error or a less serious condition that may not even be an error. The attention may not necessarily have to be handled as quickly as possible. If a secondary error or less serious condition has occurred, an attention is triggered by the respective processor, chip, component, sub-system, etc.

However, an attention or checkstop architecture has not been used for and during the initialization and set up process of an entire and overall computer system, particularly a complex computer system. Also, an attention or checkstop tree architecture for an entire and overall computer system does not exist wherein the attention or checkstop tree is able to be traversed and used to efficiently isolate and identify an error or failure and its location during system initialization. Thus, the initialization process and procedure of a complex computer system may be complicated or so involved such that detection of an error(s) or failure(s) (i.e. triggering of an attention or checkstop) may be impossible or impractical.

It is therefore advantageous and desirable to break down and set forth a sequence of steps for the initialization process or procedure of a complex computer system in order to accommodate detection of errors and failures and triggering of a respective attention or checkstop for and during the system initialization, set up, or power on. It is further advantageous and desirable to provide a system and method for maximizing fault isolation using JTAG during initialization or set up or power on of an entire and overall computer system, particularly a complex computer system.

SUMMARY OF THE INVENTION

It is therefore one object of the present invention to break down and set forth a sequence of steps for the initialization process or procedure of a complex computer system in order to accommodate detection of errors and failures and triggering of a respective attention or checkstop for and during the system initialization, set up, or power on.

It is another object of the present invention to provide a system and method for maximizing fault isolation using JTAG during initialization or set up or power on of an entire and overall computer system, particularly a complex computer system.

The foregoing objects are achieved as is now described. A sequenced initialization used for maximizing detection of errors and failures and triggering of respective attention signals. A number of computer devices each having a JTAG interface, an attention distribution sub-system, and a service processor are provided. Each computer device inaccessible during a built in self test (BIST) is coupled to an error register bit. Computer devices are reset. Functional clocks of computer devices are disabled. output drivers of computer devices are disabled. Fences for computer devices are put up so that the inputs are in a known state and computer devices driving the inputs have no effect. BISTs for computer devices are performed as they are released from reset. Determination of when BISTs are complete and if each BIST has passed is performed. The following tasks are performed via JTAG: Attention signals for computer devices are raised when BISTs are completed; Functional clocks for computer devices are started; Computer devices for system operation are configured when BISTs are complete; and output drivers of computer devices are enabled by using JTAG accesses to computer devices. Fences of computer devices are dropped after output drivers have been enabled. Computer devices are released from reset modes. A fault detection signal is triggered if a fault was detected by any computer device. A fault is driven to the attention distribution sub-system, and an attention sent out to all other computer devices by the attention distribution sub-system during the sequenced initialization. Service processor determines whether to continue with sequenced initialization depending on fault determined.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a system and method that break down and set forth a sequence of steps for the initialization process or procedure of a complex computer system in order to accommodate detection of errors and failures and triggering of a respective attention or checkstop for and during the system initialization, set up, or power on. The system and method maximize fault isolation using JTAG during initialization or set up or power on of an entire and overall computer system, particularly a complex computer system.

Figure 1:
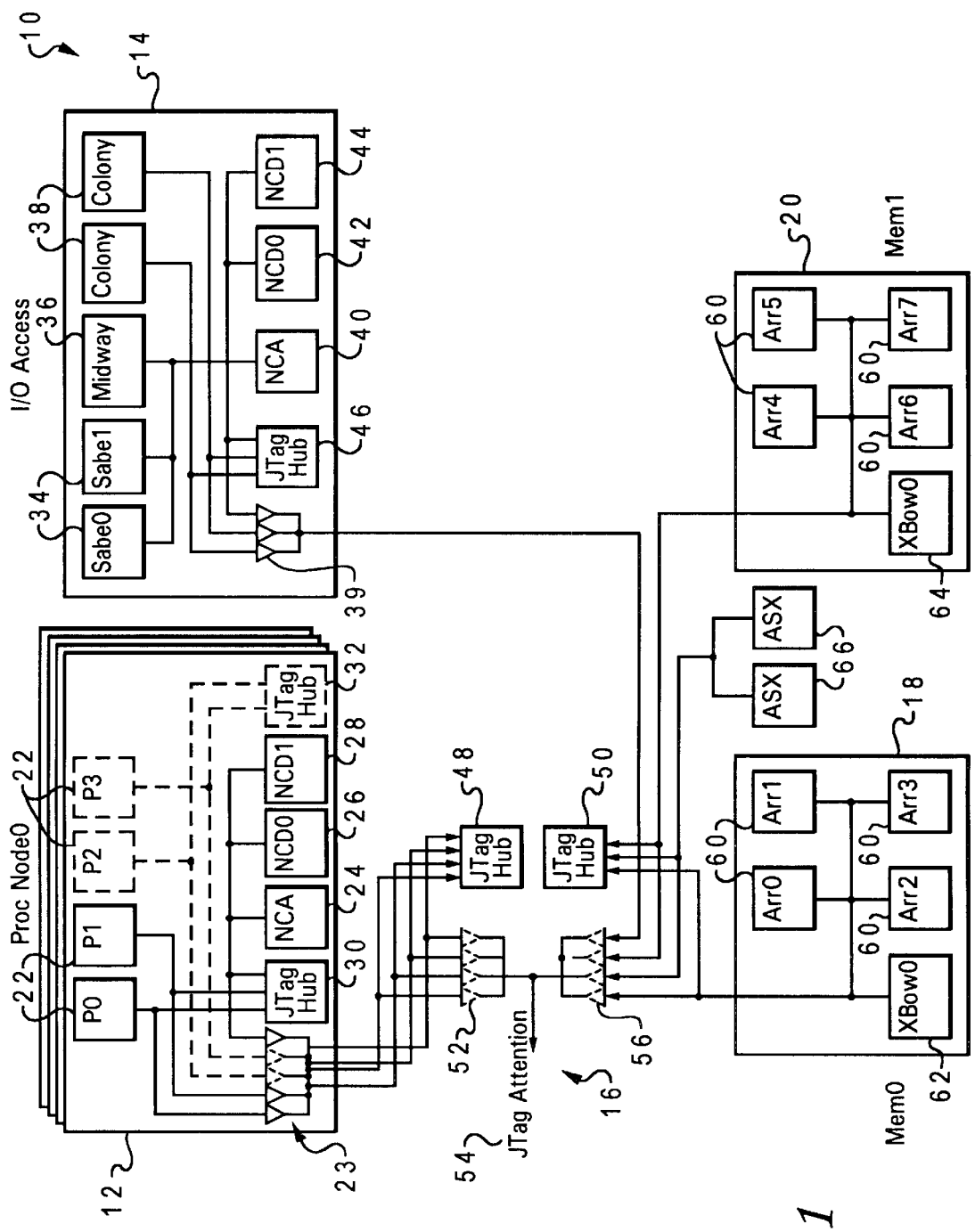
FIG. 1 is a block diagram of an example attention distribution for the present invention system and method for computer system initialization to maximize fault isolation using JTAG.

With reference now to the figures and in particular with reference to FIG. 1, a block diagram 10 showing an example attention distribution for the present invention utilized for computer system initialization to maximize fault isolation using JTAG is shown. The block diagram 10 comprises an interface block 12 for interfacing to the individual processor chips 22 (i.e. P0, P1, P2, and P3), an input/output (I/O) block 14 for providing interfaces to input or output devices, an attention distribution block 16 (i.e. JTAG hub chip 16) memory controller blocks 18 and 20. Although the JTAG hubs 48 and 50 are used in FIG. 1, they are not used for purposes related to the JTAG bus. Four (4) latches in each of the JTAG hubs are used as a "funnel" that helps isolate the source of attention. Each chip is able to pull a checkstop when an error occurs therein that will drive an attention that is seen by the service processor. The service processor queries the JTAG hubs to determine the source of the attention.

The interface block 12 comprises a plurality of individual processor chips 22 (P0, P1, P2, and P3), two node controller data (NCD) chips 26 and 28, a node controller address (NCA) chip 24, and two JTAG hubs 30 and 32. Two processor chips 22 (i.e. P0 and P1), the NCA chip 24, the NCD chips 26 and 28 are coupled to the JTAG hub 30. The other two processor chips 22 (i.e. P2 and P3) are coupled to the JTAG hub 32 wherein only a single wire from one of the processor chips 22 is raised at a time when an attention has been driven. All of the chips in the interface block 12 are coupled to the attention distribution block 16, particularly to the attention register bits 52 in the attention distribution block 16 via respective attention sub-rings 23 located in the interface block 12. Also, the attention sub-rings 23 from the interface block 12 are coupled to a JTAG hub 48 within the distribution block 16 as well. Each processor chip 22 (P0, P1, P2, and P3) has its own attention sub-ring 23, and each processor chip's attention signal is coupled directly to its own attention register bit 52 in the attention distribution block 16 on the interface block 12. These couplings are required since the JTAG interfaces of the processor chips are unable to be accessed when they are performing their respective built in self test (BIST). When the BIST operation of the processor chip is complete, then it asserts its attention from its attention register to a support or service processor. When the support or service processor responds, it queries the attention register in the attention distribution block 16 on the interface block 12 to verify that the processor chip 22 has completed its BIST before it attempts to access the JTAG interface of the processor chip. The attention lines from the processor chips are tied together in a wired "OR" operation ("wired-or"). If one signal is high from at least one processor chip, then the output from the interface block 12 is high.

The I/O block 14 comprises two Saber device chips 34, a Midway device chip 36, two Colony adapter slots 38, a node controller address (NCA) chip 40, two node controller data (NCD) chips 42 and 44, and a JTAG hub 46. All of the chips within the I/O block 14 are coupled to the JTAG hub 46 wherein only a single wire from one of the chips is raised at a time when an attention has been driven. All of the chips in the I/O block 14 are coupled to the attention distribution block 16 to attention register bits 56 in the attention distribution block 16 via respective JTAG sub-rings 39 located in the I/O block 14. Also, the JTAG sub-rings 39 from the I/O block 14 are coupled to a JTAG hub 50 within the attention distribution block 16 as well. Each Colony adapter slot 38 has its own JTAG sub-ring 39, and each Colony slot's attention signal is coupled directly to its own attention register bit 56 in the attention distribution block 16 on the interface block 12. These couplings are required since the JTAG interfaces of the Colony adapter slots are unable to be accessed when they are performing their respective built in self test (BIST). When the BIST operation of the processor chip is complete, then it asserts its attention from its attention register to a support or service processor. When the support or service processor responds, it queries the attention register in the attention distribution block 16 on the I/O block 14 to verify that the Colony adapter slot 38 has completed its BIST before it attempts to access the JTAG interface of the Colony adapter chip.

The memory controller block (Mem0) 18 has a crossbow memory controller 62 (i.e. XBow0) for handling the attention operation and a number of memory controllers 60 (Arr0, Arr1, Arr2, Arr3) coupled to the crossbow memory controller 62 (i.e. Xbow0) for handling address and data operations. The memory controller block (Mem1) 20 has a crossbow memory controller 64 (i.e. Xbow1) for handling the attention operation and a number of memory controllers 60 (Arr4, Arr5, Arr6, and Arr7) coupled to the crossbow memory controller 64 for handling address and data operations. Any of these chips or devices are able to drive attention.

The memory controller block 18 is coupled to the attention distribution block 16 by its crossbow memory controller 62 (Xbow0) being coupled to one of the attention register bits 56 and to the JTAG hub 50 within the attention distribution block 16. The memory controller block 20 is coupled to the attention distribution block 16 by its crossbow memory controller 64 (Xbow1) being coupled to another of the attention register bits 56 and to the JTAG hub 50 within the attention distribution block 16. Two processor chips 22 are also coupled to the attention distribution block by also their being coupled to a respective attention register bit 56 and the JTAG hub 50. Furthermore, address controller switches 66 are coupled to an attention register bit 56. The attention register bits 52 and 56 are coupled to an attention line 54 as shown in FIG. 1.

Referring to FIG. 1, an example of the attention operation is now discussed. The attention operation of any of the chips in FIG. 1 is, of course, separate from the primary operations of these chips. In FIG. 1, the attention distribution block 16 is the central collection location or point for all attentions from all of the chips, components, devices, etc.

For example, an attention is triggered by an error (wherein an attention also results in a checkstop), such as a secondary error or parity error. The memory controller chip Arr4 detects an error, and the Arr4 chip 60 triggers an attention. The trigger of the attention by the Arr4 chip 60 causes or allows either system initialization to continue or to be halted, depending on the type of error or failure that has occurred. The attention is sent to the attention distribution block 16 and broadcast by the attention distribution block 16. Thus, the Arr4 chip 60 will log an internal attention (All other chips, devices, components, etc. ignore the attention). The Arr4 chip 60 will drive checkstop when a failure or error is recognized, and the checkstop is so quick that it is frozen. Any checkstops are observed by the other chips, devices, components, etc. The quick and efficient driving of the attention or checkstop allows for an accurate fault isolation and picture and indication of the error or failure. Otherwise, if the attention or checkstop logic and detection were slow, another chip, device, component, etc. may instead inaccurately detect the error as occurring at its attention line, or the attention or checkstop would not at all have been detected. Furthermore, a checkstop is independent of the service processor. The service processor only knows a checkstop has occurred after it looks at an attention and determines its cause.

Figure 2:
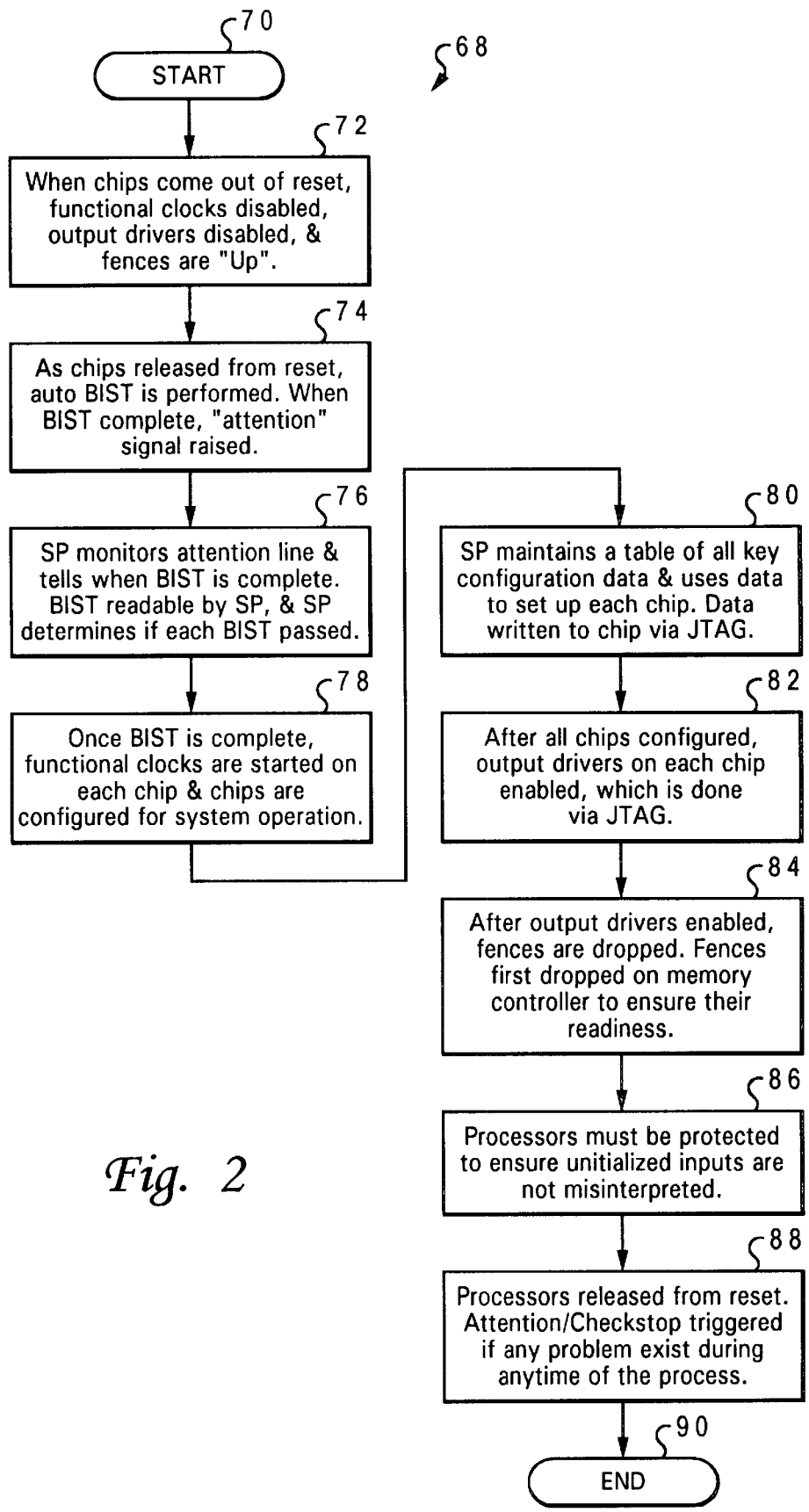
FIG. 2 is a flow chart of the algorithm that sequences the steps in the power on or initialization process of the computer system so that failures or errors are able to be better isolated and more easily traced and identified.

The power on or initialization process of a computer system needs to be broken down into sequential steps in order to better and more easily detect and isolate errors or failures during system power on or initialization. With reference now to the figures and in particular with reference to FIG. 2, an example of such sequences of steps for the power on or initialization process is shown. FIG. 2 shows a flow chart algorithm 68 that sequences the steps of the power on or initialization process of a computer system.

The flow chart algorithm 68 starts at block 70. At block 72, when chips come out of reset, all functional clocks are disabled. Also, the output drivers of the chips are disabled, and the "fences" of the chips are "up" in that the chips isolate logic and choose not to listen to any commands at this point. A "fence" is generally defined as a device which puts the inputs to a chip into a known state so that the chip driving the inputs (from its outputs) has no effect thereon if the "fences are up". The fence logic is a buffer on the key inputs of a chip. When fences are "up", inputs to the chip are ignored, and the logic of the chips are in a known state. The algorithm 68 moves to block 74 where as chips are released from reset, an automatic built in self test (BIST) is performed within each of the chips. When the BIST is complete, an "attention" signal is raised by each of the chips. The algorithm moves to block 76 where the service processor monitors the "attention" line and is able to tell when the BIST is complete. The BIST results of each chip is able to then be read by the service processor. The service processor determines if each of the tests passed.

The algorithm 68 moves to block 78. At block 78, once the BIST is complete, functional clocks are started on each chip, and the chips are configured for system operation. Some of the parameters of the chips are dependent on the configuration of the system. For example, the memory controller configuration depends on how much memory is installed, and other chip parameters depend on the number of processors present. The algorithm 68 moves to block 80 where the service processor maintains a table of all key configuration data and uses this data to set up each chip appropriately. This configuration data is written to the chip via JTAG.

The algorithm 68 moves to block 82. At block 82, after all chips are configured, the output drivers on each chip are enabled. The BIST pass or fail determination at block 76, the starting of the clocks at block 78, the device configuration at block 80, and the enabling of the output drivers at block 82 are all done via JTAG. At block 84, after all output drivers are enabled, the fences of the chips are dropped. Fences are first dropped on the memory controller chip to ensure that they are ready when the other portions of the system come "on line". At block 86, the processors do not have fence logic, and they therefore must be "protected" to ensure that uninitialized inputs are not misinterpreted. At block 88, the processors are released from reset. An attention or checkstop is triggered if any problem or problems exists during any time of the initialization or power up process/procedure. The algorithm 68 ends at block 90.

While the invention has been particularly shown and described with reference to a preferred embodiment, it will be understood by those skilled in the art that various changes in form and detail may be made therein without departing from the spirit and scope of the invention.

What is claimed is:

1. A method of sequencing an initialization process for a computer system in order to maximize fault isolation for the computer system comprising the steps of:

providing a number of computer devices within the at least one computer system, an attention distribution sub-system coupled to the computer devices, a service processor coupled to the computer devices and the attention distribution sub-system, coupling each of the computer devices that has a JTAG interface that is inaccessible during a built in self test to one of the error register bits in the attention distribution sub-system, resetting the computer devices, disabling functional clocks of the computer devices, disabling output drivers of the computer devices, putting up fences for the computer devices, performing built in self tests for the computer devices as the computer devices are released from reset, determining when the built in self tests are complete and if each of the built in self tests has passed, raising attention signals for the computer devices when the built in self tests are completed, starting functional clocks for the computer devices, configuring the computer devices for system operation when the built in self tests are complete, enabling the output drivers of the computer devices by using JTAG accesses to the computer devices, dropping the fences of the computer devices after the output drivers have been enabled, releasing the computer devices from reset modes, and triggering a fault detection signal if a fault was detected by any of the computer devices.

2. The method according to claim 1, wherein the step of determining when the built in self tests are complete and if each of the built in self tests has passed further comprises the step of:

using the service processor to monitor an attention line and to indicate when the built in self tests are complete and to determine which of the computer devices passed their built in self tests.

3. The method according to claim 1, wherein the step of configuring the computer devices for system operation further comprises the steps of:

using the service processor to maintain a table of all key configuration data for the computer devices, using the data to set up each of the computer devices, and writing the data to the computer devices through JTAG accesses.

4. The method according to claim 1, wherein the step of dropping the fences of the computer devices after the output drivers have been enabled further comprises the step of:

first dropping the fences on any of the computer devices that are memory controller devices to ensure their readiness.

5. The method according to claim 1, further comprising the step of:

protecting any of the computer devices that are processors that do not have fence logic to ensure proper interpretation of initialized inputs.

6. The method according to claim 1, wherein the fault is a fault that drives an attention.

7. The method according to claim 1, wherein the fault is a checkstop fault that drives an attention.

8. The method according to claim 1, wherein the steps of determining when the built in self tests are complete and if each of the built in self tests has passed, raising attention signals for the computer devices when the built in self tests are completed, starting functional clocks for the computer devices, configuring the computer devices for system operation when the built in self tests are complete, and enabling the output drivers of the computer devices by using JTAG accesses to the computer devices are all performed via JTAG access.

9. A system for implementing sequenced initialization for maximizing fault isolation for at least one entire computer system using JTAG comprising:

a number of computer devices within the at least one computer system wherein each of the computer devices has a JTAG interface, an attention distribution sub-system coupled to the computer devices, a service processor coupled to the computer devices and the attention distribution sub-system, wherein each of the computer devices that has a JTAG interface that is inaccessible during a built in self test is coupled to an error register bit in the attention distribution sub-system, wherein the computer devices are reset, wherein functional clocks of the computer devices are disabled, wherein output drivers of the computer devices are disabled, wherein fences for the computer devices are put up, wherein built in self tests for the computer devices are performed as the computer devices are released from reset, wherein determination of when the built in self tests are complete and if each of the built in self tests has passed is performed, wherein attention signals for the computer devices are raised when the built in self tests are completed, wherein functional clocks for the computer devices are started, wherein the computer devices for system operation are configured when the built in self tests are complete, wherein the output drivers of the computer devices are enabled by using JTAG accesses to the computer devices, wherein the fences of the computer devices are dropped after the output drivers have been enabled, wherein the computer devices are released from reset modes, and wherein a fault detection signal is triggered if a fault was detected by any of the computer devices, wherein a fault at one of the computer devices is able to be driven to the attention distribution sub-system and an attention is able to be sent out when the fault occurs to all other computer devices by the attention distribution sub-system during the sequenced initialization, and wherein the service processor determines whether to continue with the sequenced initialization of the at least one entire computer system depending on the fault determined.

10. The system according to claim 9, wherein the service processor is used to monitor an attention line and to indicate when the built in self tests are complete and to determine which of the computer devices passed their built in self tests.

11. The system according to claim 9, wherein the service processor is used to maintain a table of all key configuration data for the computer devices, wherein the data is used to set up each of the computer devices, and wherein the data is written to the computer devices through JTAG accesses.

12. The system according to claim 9, wherein the fences are first dropped on any of the computer devices that are memory controller devices to ensure their readiness.

13. The system according to claim 9, wherein any of the computer devices that are processors that do not have fence logic is protected to ensure proper interpretation of initialized inputs.

14. The system according to claim 9, wherein the fault is a fault that drives an attention.

15. The system according to claim 9, wherein the fault is a checkstop fault that drives an attention.

16. The system according to claim 9, wherein the built in self tests for the computer devices are performed as the computer devices are released from reset, the determination of when the built in self tests are complete and if each of the built in self tests has passed is performed, the attention signals for the computer devices are raised when the built in self tests are completed, the functional clocks for the computer devices are started, the computer devices for system operation are configured when the built in self tests are complete, the output drivers of the computer devices are enabled by using JTAG accesses to the computer devices are all tasks performed via JTAG access.

17. A method of providing a system for implementing sequenced initialization for maximizing fault isolation for at least one entire computer system using JTAG comprising the steps of:

providing a number of computer devices within the at least one computer system wherein each of the computer devices has a JTAG interface, coupling an attention distribution sub-system to the computer devices, coupling a service processor to the computer devices and the attention distribution sub-system, coupling each of the computer devices that has a JTAG interface that is inaccessible during a built in self test to an error register bit in the attention distribution sub-system, resetting the computer devices are reset, disabling functional clocks of the computer devices, disabling output drivers of the computer devices, putting up fences for the computer devices, performing built in self tests for the computer devices as the computer devices are released from reset, determining when the built in self tests are complete and if each of the built in self tests has passed, raising attention signals for the computer devices when the built in self tests are completed, starting functional clocks for the computer devices, configuring the computer devices for system operation when the built in self tests are complete, enabling the output drivers of the computer devices by using JTAG accesses to the computer devices, dropping the fences of the computer devices after the output drivers have been enabled, releasing the computer devices from reset modes, triggering a fault detection signal if a fault was detected by any of the computer devices, driving a fault that occurs during the sequenced initialization at one of the computer devices to the attention distribution sub-system, sending out an attention from the attention distribution sub-system when the fault occurs during the sequenced initialization to all other computer devices, and determining whether the service processor is to continue with the sequenced initialization of the at least one entire computer system depending on the fault determined.

18. The method according to claim 17, further comprising the step of:

using the service processor to monitor an attention line and to indicate when the built in self tests are complete and to determine which of the computer devices passed their built in self tests.

19. The method according to claim 17, further comprising the steps of:

using the service processor to maintain a table of all key configuration data for the computer devices, using the data to set up each of the computer devices, and writing the data to the computer devices through JTAG accesses.

20. The method according to claim 17, wherein the step of dropping the fences further comprises the step of:

first dropping the fences on any of the computer devices that are memory controller devices to ensure their readiness.

21. The method according to claim 17 further comprising the step of:

protecting any of the computer devices that are processors that do not have fence logic to ensure proper interpretation of initialized inputs.

22. The method according to claim 17, wherein the fault is a fault that drives an attention.

23. The method according to claim 17, wherein the fault is a checkstop fault that drives an attention.

24. The method according to claim 17, wherein the steps of determining when the built in self tests are complete and if each of the built in self tests has passed, raising attention signals for the computer devices when the built in self tests are completed, starting functional clocks for the computer devices, configuring the computer devices for system operation when the built in self tests are complete, and enabling the output drivers of the computer devices by using JTAG accesses to the computer devices are all performed via JTAG access.

* * * * *